(No Model.) 2 Sheets—Sheet 1.
A. S. OBERSON.
STUMP PULLER.
No. 567,039. Patented Sept. 1, 1896.
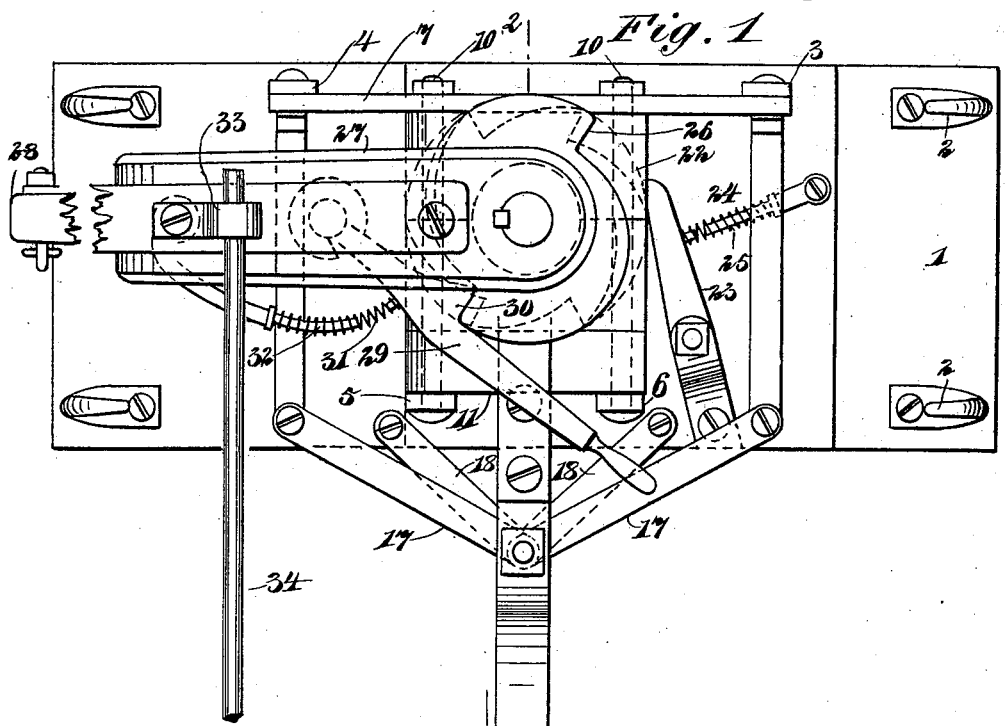
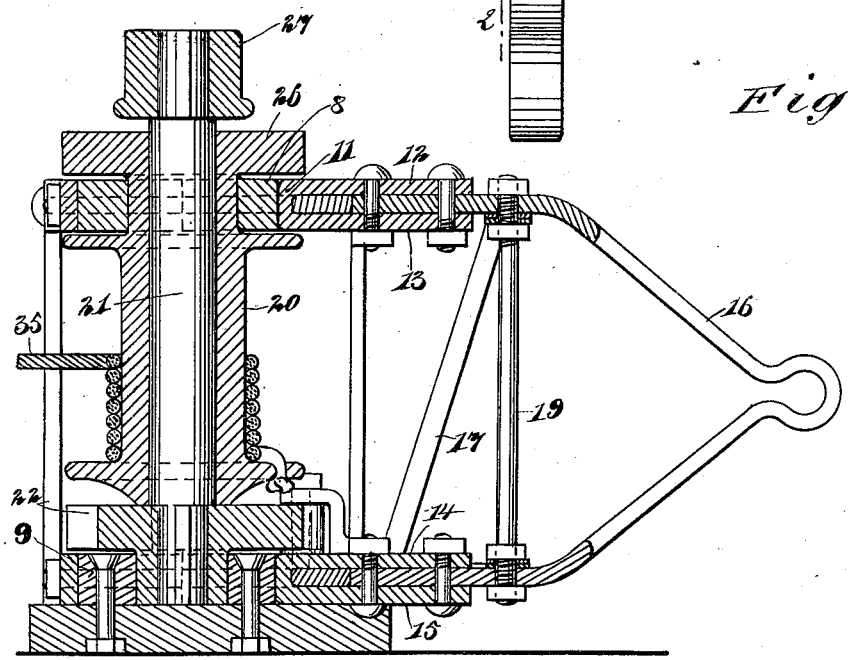
WITNESSES:
C. Neveux
C. R. Ferguson
INVENTOR
A. S. Oberson.
BY
ATTORNEYS.
THE NORRIS PETERS CO., PHOTO-LITHO., WASHINGTON, D. C.

(No Model.)

A. S. OBERSON.
STUMP PULLER.

No. 567,039.

2 Sheets—Sheet 2.

Patented Sept. 1, 1896.

WITNESSES:
C. Neveux
C. R. Ferguson

INVENTOR
A. S. Oberson
BY
ATTORNEYS.

UNITED STATES PATENT OFFICE.

ALFRED S. OBERSON, OF WESTBY, WISCONSIN.

STUMP-PULLER.

SPECIFICATION forming part of Letters Patent No. 567,039, dated September 1, 1896.

Application filed May 29, 1896. Serial No. 593,601. (No model.)

*To all whom it may concern:*

Be it known that I, ALFRED S. OBERSON, of Westby, in the county of Vernon and State of Wisconsin, have invented a new and Improved Stump-Puller, of which the following is a full, clear, and exact description.

This invention relates to devices for pulling tree-stumps from the ground, and the object is to provide a very strong machine that may be easily operated, and which is so constructed that the winch cannot fly backward should the harness or the connection between a horse and the winding-sweep be broken when there is a heavy strain on the pulling-cable.

I will describe a stump-puller embodying my invention and then point out the novel features in the appended claims.

Reference is to be had to the accompanying drawings, forming a part of this specification, in which similar characters of reference indicate corresponding parts in all the views.

Figure 3:
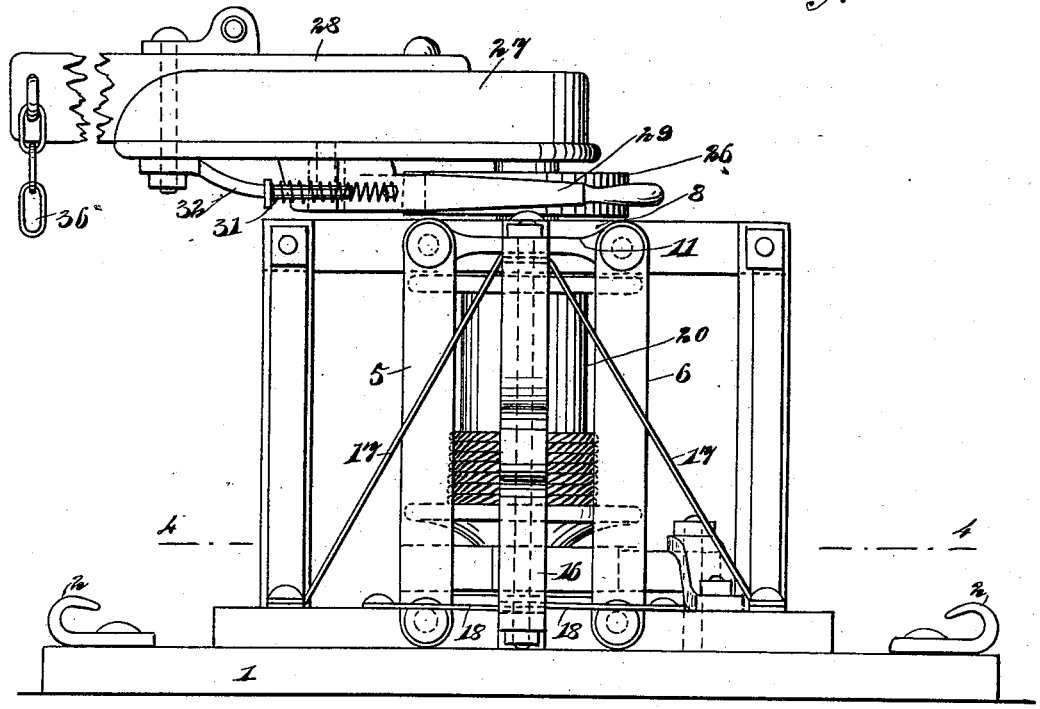
Figure 4:
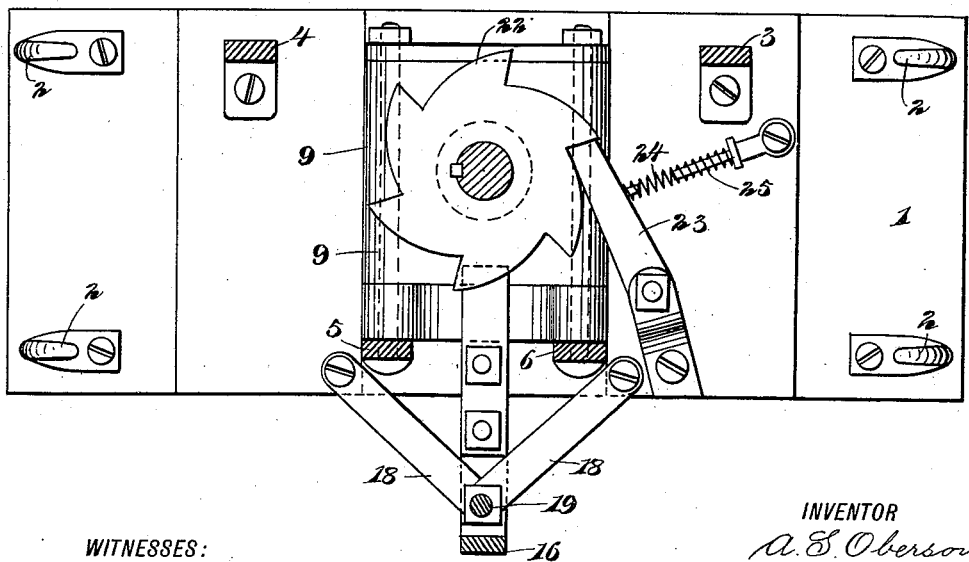

Figure 1 is a plan view of a stump-puller embodying my invention. Fig. 2 is a vertical section on the line 2 2 of Fig. 1. Fig. 3 is a side elevation, and Fig. 4 is a section on the line 4 4 of Fig. 3.

The machine comprises a platform 1, the ends of which at the under side may be slightly curved upward, so that said platform, with the machine thereon, can be easily drawn over the ground by attaching a horse to either end of the platform. I have shown hooks 2 on the ends of the platform, to which the whiffle-tree-chain may be attached.

Mounted on the platform 1 are upwardly-extended posts 3, 4, 5, and 6. The upper ends of the posts 3 and 4 are connected by a cross-bar 7, and between the cross-bar 7 and the upper ends of the posts 5 and 6 a head-plate 8 is attached, and supported on the base between the lower ends of the posts 3 4 and 5 6 is a base-block or bearing 9. The head-block 8 is secured to the bar 7 and to the posts 5 and 6 by means of screw-rods 10, and these screw-rods 10 also engage with a block 11, from which clip-fingers 12 and 13 extend outward. Similar clip-fingers 14 and 15 extend outward from the base-block 9.

An anchor-yoke 16 has its upper extremity bolted between the arms 12 and 13 and its lower extremity bolted between the arms 14 and 15. Lateral braces 17 extend upward from the base to a connection with the upper extremity of the anchor-yoke 16, and braces 18 extend from said base to a connection with the lower extremity of said anchor-yoke. These several braces are secured to the yoke by means of a vertical rod 19, having its ends extended through the braces and through the extremities of the yoke and provided on the outer and inner sides with tightening-nuts. A vertical tubular winch or spindle 20 is mounted loosely on a vertical shaft 21, which at its lower end is keyed to a ratchet-wheel 22, the hub portion of said ratchet-wheel having a bearing in the lower bearing-block 9. This ratchet-wheel 22 is engaged by a pawl 23, having pivotal connection with the base and pressed into engagement with said ratchet-wheel by means of a spring 24, mounted on a rod 25, secured to said base. The winch 20 is provided with an annular flange at its lower end and a similar annular flange at its upper end. Above the upper flange the winch has a reduced portion which has a bearing through the head-block 8, and above this head-block 8 the said reduced portion terminates in a ratchet-wheel 26, which is here shown as having two diametrically opposite abutment-teeth.

Secured to the upper extended end of the shaft 21 is a horizontally-disposed box-like casting 27, into which the inner end of a sweep-arm 28 is secured. Pivotally connected to the under side of this box-like casting 27 is a stop-lever 29, having a tooth 30 on its inner edge adapted to engage with either one of the abutment-teeth on the ratchet-wheel 26. This lever 29 is held in yielding engagement with the ratchet-wheel by means of a spring 31, mounted on a curved arm 32, attached to the casting 27. The sweep-arm 28 is provided on its upper side with an eye or clip 33, adapted to engage the inner end of a lead-pole 34, the said lead-pole being extended at right angles to the sweep.

The operation is as follows: A chain or cable is attached at one end to the anchor-yoke 16 and at the opposite end to a tree or stump in line with the stump to be drawn out of the ground. The cable 35, extended from the winch 20, is then attached to the stump to be drawn out. A horse will be hitched to the other chain 36 on the outer end of the sweep-arm 28, and the halter-strap of the horse will be tied to the lead-pole 34. As the horse walks around the lever 29, being in engagement with an abutment-tooth of the ratchet-wheel 26, will cause the winch to rotate with the shaft 21. During this movement the pawl 23 will engage successively the teeth or shoulder portions of the ratchet-wheel 22, so that should a portion of the harness be broken or the horse be released from the sweep-arm 28 this pawl or ratchet connection will prevent a backward movement of the winch, which might result under a heavy strain should the said pawl-and-ratchet mechanism be omitted. After pulling the stump the lever 29 is to be drawn out of engagement with the ratchet-wheel 26, and then the winch may be easily turned in the opposite direction relatively to the shaft 21 to ease up on the cable.

Having thus described my invention, I claim as new and desire to secure by Letters Patent—

1. A stump-puller, comprising a base, uprights or posts on said base, a head-plate supported by the upper ends of said uprights or posts, a base-block, a vertical shaft having a bearing in the said base-block, a ratchet-wheel attached to the lower end of said shaft, a pawl coacting therewith, a winch mounted to rotate on the shaft and having a bearing through the head-block, a sweep-arm extended horizontally from the upper ends of said shaft, a lever pivoted to said sweep-arm, and a ratchet-wheel on the winch adapted to be engaged by said lever, substantially as specified.

2. A stump-puller, comprising a base, posts extended upward therefrom, a head-block supported by the upper ends of said posts, a base-block, clip-arms extended outward from said block, an anchor-yoke having its extremities fastened to said clip-arms, braces extended from the base to the extremities of said yoke, a vertical rod for securing the braces to the upper and lower extremities of the yoke, a vertical shaft having a bearing in the base-block, a winch mounted to rotate on said shaft, a ratchet-wheel secured to the shaft below the winch, a spring-pressed pawl engaging said ratchet-wheel, a ratchet-wheel secured to the upper end of the winch, a box-like casing extending horizontally from the upper end of the shaft, a lever pivotally connected to the under side of said casing and having a tooth to engage the teeth of the ratchet-wheel on the winch, a sweep-arm attached to the said casing, and a clip on said sweep-arm for the attachment of a lead-pole, substantially as specified.

ALFRED S. OBERSON.

Witnesses:
K. VILLAND,
JULIUS GILBERG.